No. 877,758.

PATENTED JAN. 28, 1908.

G. G. CONNOR.
SKID AND TRUCK.
APPLICATION FILED JAN. 5, 1907.

Witnesses
C. H. Walker
George Oltsch

Inventor
George G. Connor
By Theodore _____
Attorney

UNITED STATES PATENT OFFICE.

GEORGE G. CONNOR, OF SOUTH BEND, INDIANA.

SKID AND TRUCK.

No. 877,758.   Specification of Letters Patent.   Patented Jan. 28, 1908.

Application filed January 5, 1907. Serial No. 350,934.

*To all whom it may concern:*

Be it known that GEORGE G. CONNOR, a citizen of the United States, residing at South Bend, in the county of St. Joseph and State of Indiana, has invented certain new and useful Improvements in Skids and Trucks, of which the following is a specification.

This invention relates to a combined skid and truck.

One object is to provide a device convertible into a skid or into a truck without the employment of detachable parts or fastenings.

Another object resides in the provision of a device of the character stated embodying such characteristics that the axle of the truck may be arranged to provide an article arresting and supporting member for the truck and to be swung down when the device is desired for skidding purposes.

A still further object is to provide a simple, inexpensive, durable and efficient combined skid and truck.

With the above and other objects in view, the present invention consists in the combination and arrangement of parts hereinafter more fully described, shown in the accompanying drawing and particularly pointed out in the appended claims.

Figure 1:
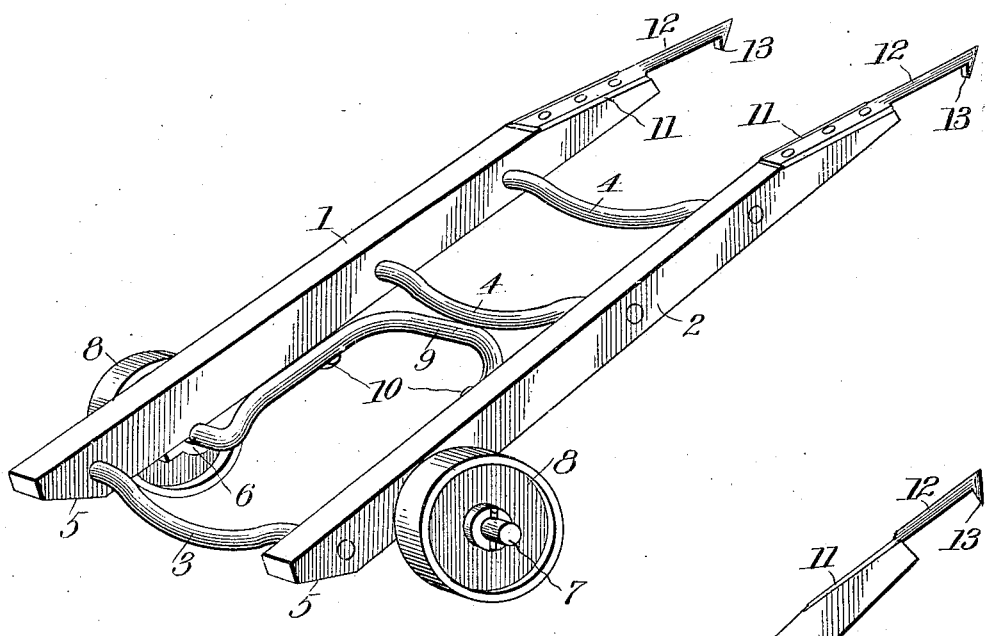
Figure 2:
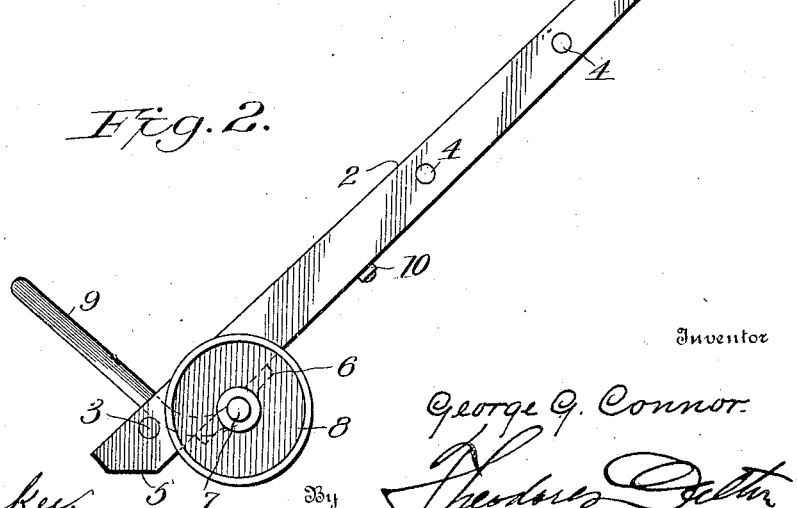

In the drawings:—Figure 1 is a perspective view of the device when used for skidding purposes; and Fig. 2 is a side elevation when used as a truck.

Referring now more particularly to the accompanying drawing, the reference characters 1 and 2 indicate side sills connected at their front end by the curved stop bar 3 and intermediate their ends by the curved braces 4. The sills and brace bars constitute a frame and the brace bars together with the stop bar are preferably curved thereby permitting barrels and the like to have proper engagement upon the sills. The rear under face of each sill may or may not be beveled, they being shown beveled at 5.

Suitable castings are secured in alinement to the under face of the sills near their rear ends to form bearings 6 for the axle 7 upon the ends of which are disposed the wheels 8. As shown, the axle in the present instance is of peculiar formation, in that it is provided intermediate its ends with an offset loop portion forming an article arresting and holding member 9. This member 9 is disposed between the sills and is designed to form the article arresting and holding member when the device is used as a truck, as shown in Fig. 2, and as shown in Fig. 1, it is designed to be swung down between the sills when the device is used as a skid. When the member 9 is thrown up, it is limited in its swing by engagement with the stop bar 3 and when it is thrown down it is limited in its swing by engagement with the stops 10 of the sills.

The inner ends of the sills have their upper faces preferably beveled, as at 11, and upon these faces the inner end of the hooks 12 are secured in any suitable manner, the bills 13 of the hooks 12 being pointed and designed to engage or bite into the rear portion of the front of a wagon or other base (not shown) when the device is used as a skid, or to be grasped when the device is used as a truck.

In the use of the invention, boxes, trunks, barrels or other articles may be slid down the skid and against the article arresting and holding portion of the axle and the hooked ends used as handles to cart away the articles.

Having thus described my invention, what I claim and desire to secure by Letters Patent, is:—

1. In a device of the class described, an article holding and arresting means adapted to be swung into and out of operative position, and wheels upon said arresting means.

2. A device of the character described comprising connected sills, an axle rotatably carried by the sills, wheels upon the axle, the axle having a loop portion arranged between the sills adapted to be projected above the same, and stops to engage the axle to limit the rotation of the axle and its loop portion.

3. A device of the character described comprising connected sills, an axle rotatably carried by the sills, wheels upon the axle, the axle having a loop portion arranged between the sills, stops carried by the sills to limit the rotation of the axle and its loop portion, and a hook secured to the inner end of each sill.

4. A device of the class described, comprising connected sills, an axle carried by the sills, wheels upon the axle, the axle having a looped portion arranged between the sills and adapted to be swung into a position to form an article holding and arresting means.

5. A device of the class described comprising sills, an axle rotatably carried by the sills, wheels upon the axle, the axle having a looped portion arranged between the sills, stops carried by the sills for engagement with the axle to limit the rotation of the axle.

6. A device of the class described, comprising connected sills, hooks secured to the inner ends of the sills, adapted to form handle portions when used as a truck and securing means when used as a skid, a rotatable axle carried by the outer ends of the sills and stops to engage the axle to limit the rotation of the same.

7. A device of the class described comprising connected sills, a looped axle rotatably carried by the sills, the looped portion adapted to be swung upwardly to form an article holding and arresting means and to be swung downwardly between the sills when not in use, a stop to limit the upward movement of the axle and stops to limit the downward movement thereof.

8. A device of the class described comprising connected sills, a looped axle disposed between the sills, the looped portion adapted to be swung to a position above the sills to form an article arresting means.

In testimony whereof I have signed my name to this specification in the presence of two subscribing witnesses.

GEORGE G. CONNOR.

Witnesses:
 GEORGE OLTSCH,
 G. M. COLE.